United States Patent
Toyozawa et al.

(10) Patent No.: US 7,215,089 B2
(45) Date of Patent: May 8, 2007

(54) THREADING/TAPPING CONTROL APPARATUS

(75) Inventors: Yukio Toyozawa, Kikuchi-gun (JP); Naoto Sonoda, Kamimashiki-gun (JP)

(73) Assignee: Fanuc Ltd, Yamanashi (JP)

( * ) Notice: Subject to any disclaimer, the term of this patent is extended or adjusted under 35 U.S.C. 154(b) by 186 days.

(21) Appl. No.: 11/043,163

(22) Filed: Jan. 27, 2005

(65) Prior Publication Data

US 2005/0168178 A1 Aug. 4, 2005

(30) Foreign Application Priority Data

Jan. 30, 2004 (JP) ............................. 2004-023993

(51) Int. Cl.
H02P 5/46 (2006.01)

(52) U.S. Cl. ................. 318/68; 318/675; 318/568.1; 318/434; 318/574; 318/575

(58) Field of Classification Search ............. 318/68, 318/675, 568.1, 574, 575, 566, 567, 568, 318/434; 901/9, 15

See application file for complete search history.

(56) References Cited

U.S. PATENT DOCUMENTS 5,086,964 A * 2/1992 Blaser .................. 226/108
5,698,034 A * 12/1997 Clark et al. ............... 118/669
2002/0185926 A1* 12/2002 King et al. ............... 640/68 B

FOREIGN PATENT DOCUMENTS

| JP | 03-212705 | 9/1991 |
|----|-----------|--------|
| JP | 4-201061 | 7/1992 |
| JP | 5-69275 | 3/1993 |
| JP | 05-341847 | 12/1993 |
| JP | 8-141839 | 6/1996 |
| JP | 2757269 | 3/1998 |
| JP | 10-143215 | 5/1998 |

* cited by examiner

Primary Examiner—Karen Masih
(74) Attorney, Agent, or Firm—Drinker Biddle & Reath LLP

(57) ABSTRACT

A workpiece is rotated by a master motor and a tool is linearly moved by a slave motor to cut a thread in the workpiece. Position feedback of the master motor is multiplied by a coefficient K and the result used as the position command of the slave motor. Provision is made of an angle synchronization learning control unit for storing one pattern cycle's worth of the correction data of the threading and adding the same to the position deviation. This control unit stores one pattern cycle's worth of the correction data corresponding to the position feedback of the master motor. The position is converted to the correction data corresponding to the time at that time based on the stored correction data to find the correction data and this is added to the position deviation.

11 Claims, 9 Drawing Sheets

THREADING/TAPPING CONTROL APPARATUS

BACKGROUND OF THE INVENTION

1. Field of the Invention

The present invention relates to a threading/tapping control apparatus for synchronous control of a rotational shaft and a linear feed shaft when threading or tapping a workpiece.

2. Description of the Related Art

When threading a workpiece, the threading is carried out by rotating the workpiece while using a cutting tool to give a predetermined cut to the workpiece and making the cutting tool move relatively in the workpiece axial direction. In this case, the cutting tool must be made to move relatively with respect to the workpiece in the axial direction in synchronization with the rotation of the workpiece. Further, when tapping a workpiece by a tapper, the rotation of the tapper and the feed in the axial direction must be synchronized.

In this threading, to synchronize the rotational shaft and the linear feed shaft, the method of detecting the rotational speed of the rotational shaft (spindle) rotating the workpiece, finding a movement command of the feed shaft of the tool from this detected rotational speed, and making the tool move in the axial direction by it so as to make the tool move in the axial direction in synchronization with the rotation of the workpiece to perform the threading is known (see Japanese Unexamined Patent Publication (Kokai) No. 5-69275).

Further, an invention outputting the movement command to a motor of a feed shaft for feeding a tapper in the axial direction and performing synchronous control using the output of a pulse generator attached to the motor and the acceleration of the movement command of the tapper feed shaft added together as the rotational speed command of the tapper is known (see Japanese Unexamined Patent Publication (Kokai) No. 8-141839).

Summarizing the problems to be solved by the invention, when threading/tapping a workpiece, synchronization between the rotational shaft and the feed shaft must be obtained. In the past, the speed of one shaft is made constant, and the other shaft is driven in synchronization with the speed of that shaft in the machining. For this purpose, the movement speed of one shaft of the rotational shaft or the feed shaft is detected, and the speed of the other shaft is controlled so as to be synchronized with that speed.

If, however, in threading, the operating speed changes due to a change of the command or an outside disturbance, there is the problem that synchronization error occurs between the workpiece and the tool and the threading precision is degraded. Further, in the case of tapping, if the delay of a servo system of an acceleration/deceleration zone becomes large, the synchronization error will become large and faster machining will become difficult.

SUMMARY OF THE INVENTION

An object of the present invention is to provide a threading/tapping control apparatus reducing synchronization error even if an operating speed changes due to a change of a command speed or an outside disturbance and reducing synchronization error in an acceleration/deceleration zone.

According to the present invention, there is provided a threading/tapping control apparatus for synchronizing a master motor and a slave motor, one of which is connected to a tool and the other of which is connected to a workpiece, and making them repeatedly perform a threading/tapping operation, comprising a correction data processing unit for finding correction data of position deviation of said slave motor at a predetermined position of one pattern of repeated operation of threading/tapping based on the position deviation of the slave motor at a reference position serving as a standard for synchronizing the slave motor; a correction data memory for storing one pattern's worth of the found correction data; a position correction processing unit for preparing a position correction amount for the position deviation at said reference position from said stored correction data; and a position control unit for using said position correction amount to correct the position deviation of said slave motor to control the position of the slave motor.

Further, in order to find the position deviation of said slave motor, it is also possible to provide a position feedback detection unit for detecting the position feedback of each of the master motor and the slave motor, a command processing unit for computing the position command to the slave motor from the position feedback of said master motor, and a position deviation processing unit for finding the position deviation of the slave motor from the position command to said slave motor and the position feedback of said slave motor.

In place of this, in order to find the position deviation of said slave motor, it is also possible to provide a command input portion for inputting a position command to the master motor, a position feedback detection unit for detecting a position feedback of the slave motor, a command processing unit for computing a position command to the slave motor from the position command to the master motor, and a position deviation processing unit for finding the position deviation of the slave motor from the position command to the slave motor and the position feedback of the slave motor.

Further, in the same way as the slave motor, position control can be carried out with respect to the master motor as well by correcting the position deviation.

Further, the reference position can be made any of the position feedback to the master motor, the position feedback of the master motor, or the position feedback of the slave motor. A selection unit for selecting the reference position can be provided.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
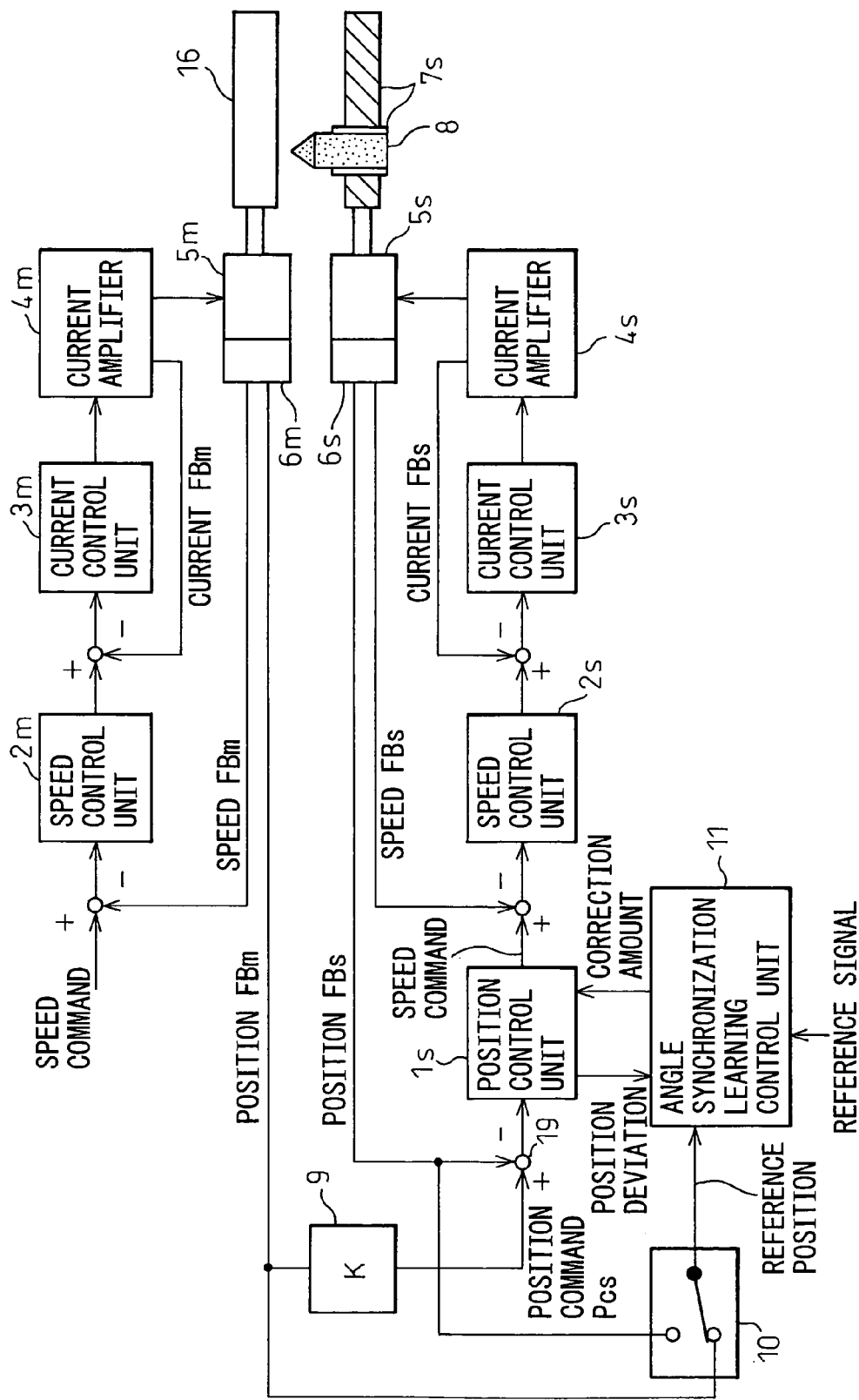
FIG. 1 is a block diagram of principal parts of a first embodiment of the present invention.

Below, an explanation will be given of embodiments of the present invention together with the drawings. FIG. 1 is a block diagram of a first embodiment of the present invention. This embodiment is an example of threading a workpiece 16. In this example, a workpiece 16 is rotated by a master motor 5m, and a tool (cutting tool) 8 is moved in the axial direction of the center of rotation of the workpiece 16 by a ball screw/nut mechanism 7s driven by a slave motor 5s.

A speed command output from a host controller such as numerical control unit is subtracted by a speed feedback from a position and speed detector 6m for detecting the position and speed of the master motor 5m and attached to the master motor 5m to find the speed deviation. A speed control unit 2m performs proportional, integrated, or other speed loop control based on the speed deviation and finds a torque command (current command). This torque command (current command) is subtracted by a current feedback detected by a current detector (not illustrated) provided inside a current amplifier 4m to find a current deviation. Based on this, a current control unit 3m performs the current loop control. The output of the current control unit 3m is used to drive the master motor 5m via the current amplifier 4m to rotate the workpiece 16 at the instructed speed.

On the other hand, a position command Pcs with respect to the slave motor 5s for driving the tool (cutting tool) 8 is calculated by the command processing unit 9 by multiplying the position feedback from the position and speed detector 6m attached to the master motor 5m by a predetermined coefficient K. The processing unit 19 subtracts from this position command Pcs the position feedback from the position and speed detector 6s attached to the slave motor 5s and detecting the position and the speed of the slave motor to find a position deviation ε. Further, in the present embodiment, it adds a correction amount found at an angle synchronization learning control unit 11 to the position deviation ε for correction. Position loop control multiplying the corrected position deviation by a position gain to find the speed command is carried out by the position control unit 1s. Note that details of this angle synchronization learning control unit 11 will be explained later.

The speed command output from this position control unit 1s is subtracted by the speed feedback of the slave motor output from the position and control detector 6s to find the speed deviation. The speed control unit 2s performs proportional, integrated, or other speed loop control based on the speed deviation to find the torque command (current command). This torque command (current command) is subtracted by current feedback detected by a current detector (not illustrated) provided inside a current amplifier 4s to find a current deviation. Based on this, the current control unit 3s performs current loop control. The output of the current control unit 3s is used to drive the master motor 5s via the current amplifier 4s and change the rotational movement to linear movement by the ball screw/nut mechanism 7s to linearly move the tool (cutting tool) 8. By this, a thread is formed on the outer circumference of the workpiece 16. In order to cut the workpiece 16 by the tool 8, the tool 8 is made to move relatively in a vertical direction to the rotational axis of the workpiece 16 (detailed explanation of this point is omitted). Then, the depth of cut is sequentially increased and the same operation is repeatedly executed for the threading.

By determining the coefficient K to be multiplied with the position feedback of the master motor 5m by the command processing unit 9 in accordance with the lead of the thread to be cut, the desired thread can be cut into the outer circumference of the workpiece 16.

The above configuration is substantially the same as that of conventional synchronous control for threading except for the angle synchronization learning control unit 11 and the point that the correction amount found by the angle synchronization learning control unit 11 is added to the position deviation to correct it. The present invention has as its characteristic feature the provision of this angle synchronization learning control unit 11. Threading consists of repeatedly executing the same pattern of operation, therefore learning control reduces the position deviation and enables high precision threading. In addition, the present embodiment performs this learning control by finding a correction amount matching with the angle (position) to reduce the position deviation. Accordingly, even if the rotational speed of the master motor 5m changes or the rotational speed of the master motor 5m fluctuates due to some sort of outside disturbance, no synchronization error occurs and high precision threading is enabled.

Figure 2:
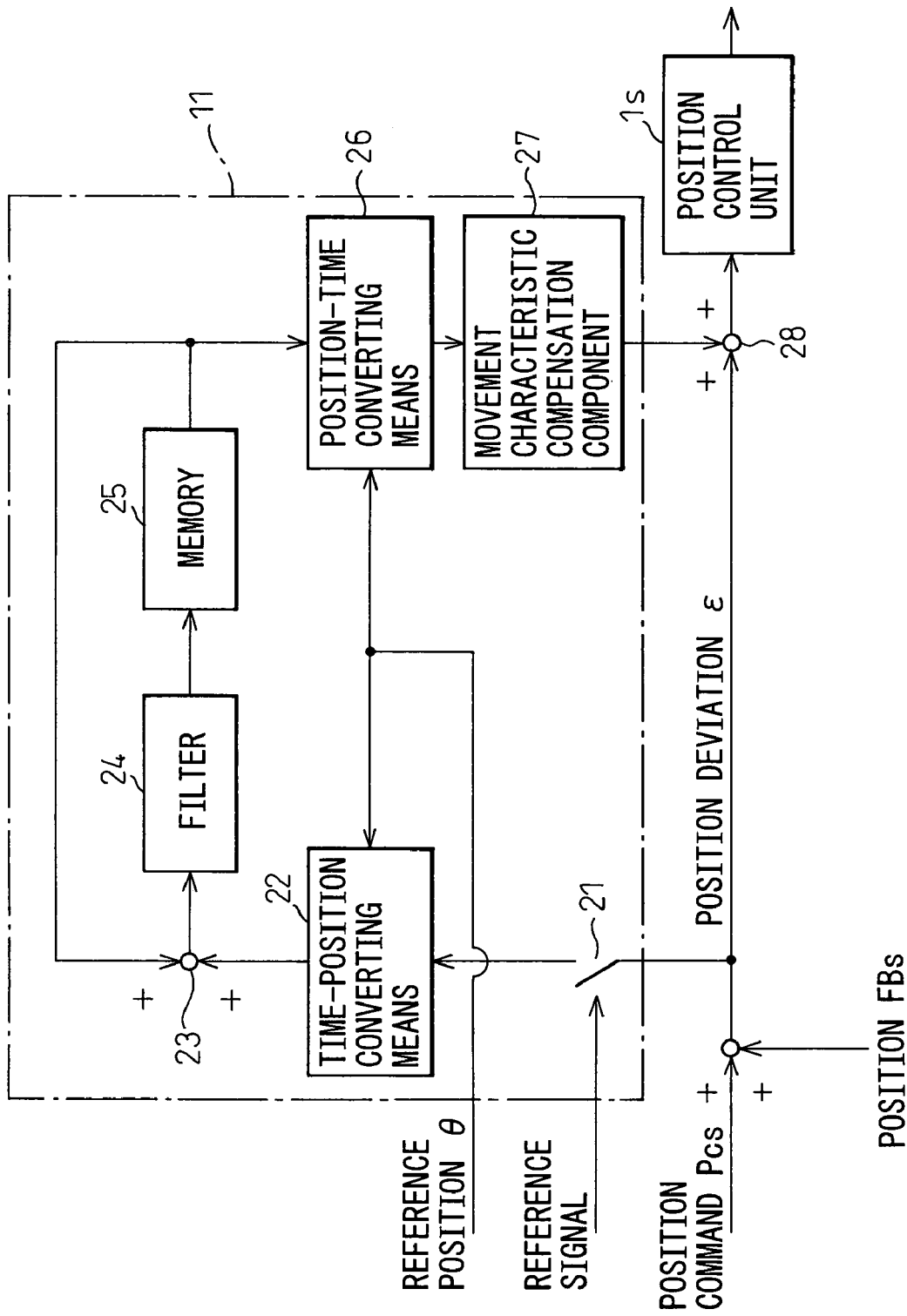
FIG. 2 is a detailed block diagram of an angle synchronization learning control unit in the same embodiment.

FIG. 2 is a detailed block diagram of this angle synchronization learning control unit 11. In the angle synchronization learning control unit 11, when a switch 21 is turned on by a reference signal from the host controller etc., the position deviation ε for every predetermined sampling cycle (for every position and speed loop processing cycle) is input to a time-position converting means 22. The time-position converting means 22 converts the position deviation ε for every predetermined sampling cycle to the position deviation at any predetermined position θ(n) among reference positions Θ corresponding to predetermined sampling cycles as will be explained in detail later. Namely, it converts time base data to position base data. Next, an adder 23 adds the position deviation at the predetermined position θ(n) found by the time-position converting means (first converting means) 22 and the correction data at the corresponding predetermined position θ(n) one pattern cycle before stored in a memory means 25. The output of the adder 23 is filtered by a filter means (for example, an FIR type low pass filter) 24 to find the correction data. The correction data at each predetermined position is stored in the memory means 25. Further, the correction data read out from the memory portion corresponding to each predetermined position θ(n) of the memory means 25 is converted from position base correction data to time base correction data by the position-time converting means (second converting means) 26 as will be explained in detail later. A movement characteristic compensation component 27 compensates the time base correction data for the phase delay of the control object and the amount of drop of gain and outputs the result to the processing unit 28. Here, the memory means 25 has a memory for storing the correction data corresponding to one pattern's worth of positions of a repeatedly executed operation. Note that the time-position converting means 22 and the adder 23 form a correction data processing unit, and the position-time converting means 26 forms a position correction processing unit.

The reference position Θ is a position serving as the standard for synchronizing the slave motor 5s. In this first embodiment, either of the position feedback from the position and speed detector 6m of the master motor 5m or the position feedback from the position and speed detector 6m of the slave motor 5s is selected by the selecting means 10 (FIG. 1). In the following explanation, the selector 10 selects the position feedback from the position and speed detector 6m of the master motor 5m as the reference position $\Theta$.

The memory 25 stores at least the correction data at the predetermined positions $\theta(n)$ of one pattern of the repeatedly instructed operation in the threading (for example, when threading the entire length of the workpiece 16, a portion from the operation start position of the workpiece to the operation end position is defined as one pattern or one to several rotations worth of the workpiece may be defined as one pattern). Here, a predetermined position $\theta(n)$ is a position obtained by dividing one pattern of operation into every predetermined movement distance and is selected so as to match with any of the reference positions $\Theta$ so long as the speed does not change. The memory 25 can store at least $(2\pi/d)$ number where one pattern cycle is $2\pi$ and the division width is d. For example, if $(2\pi/d)=q$, the memory 25 stores the correction data at each position $\theta(n)$ from the position $\theta(0)=0=2\pi$ to the position $\theta(q-1)=2\pi-d$ in one pattern. Below, each position at which the correction data is stored in the memory 25 from this $\theta(0)=0=2\pi$ to the position $\theta(q-1)$ will be referred to as a "grid position".

When the switch 21 is turned on by a reference signal, the time-position converting means 22 designates the input reference position $\Theta$ as the origin position (origin grid position) of the pattern cycle in the repeated control and designates the position as $\theta(0)$. After this, the grid position $\theta(n)$ in the pattern cycle is found from the position input as the reference position $\Theta$. Next, the deviation at the grid position $\theta(n)$ is found. The position deviation c is a function of time found for every predetermined sampling cycle (position and speed loop processing cycle). Namely, it is not found corresponding to the position of the workpiece 16 or the rotation position of the master motor 5m or the slave motor 5s. Therefore, the time-position converting means 22 converts the position deviation $\epsilon$ found in the sampling cycle to the position deviation at the grid position $\theta(n)$ previously determined based on the reference position $\Theta$ as will be explained later. Then, the adder 23 adds the position deviation at the grid position $\theta(n)$ and the correction data $\delta(n)$ corresponding to the grid position $\theta(n)$ stored in the memory 25, filters the result at the filter 24 to find the updated correction data $\delta(n)$ at the grid position $\theta(n)$, and updates the correction data stored at the grid position $\theta(n)$.

Further, the position-time converting means 26 finds the correction data $\delta(n)$ at the reference position $\Theta$ at the time of sampling from the correction data $\delta(m)$ and $\delta(m+1)$ at the grid positions $\theta(m)$ and $\theta(m+1)$ before and after the reference position $\Theta$ based on the reference position $\Theta$ found in the sampling cycle for every sampling cycle (position and speed loop processing cycle). This "correction data" means the correction data at the time of sampling and becomes correction data using time as a base. The phase delay and the drop of the gain of the thus found correction data are compensated for by the movement characteristic compensation component 27 in the same way as the conventional case to find the correction amount, this is output to the processing unit 28, this correction amount is added to the position deviation $\epsilon$, and this is multiplied by the position gain of the position control unit 1s to find the speed command.

The reference signal for turning on the switch 21 is output when positioning the tool 8 at the threading start position with respect to the workpiece 16 and starting the synchronization control of the master motor 5m and the slave motor 5s. When the switch 21 is turned on by the input of this reference signal, if designating the input reference position $\Theta$ as the origin position (origin grid position) of the pattern cycle in the repeated control and designating the position as $\theta(0)$, the reference positions $\Theta$ and the positions of the master motor 5m have a one-to-one correspondence. The reference position one pattern cycle before corresponds to the position of the master motor 5m of the pattern cycle. The correction data comprised by the position deviation etc. at that time is added to the position deviation at the time of sampling. This means that the correction data comprised by the position deviation etc. one pattern cycle before is added.

Figure 3:
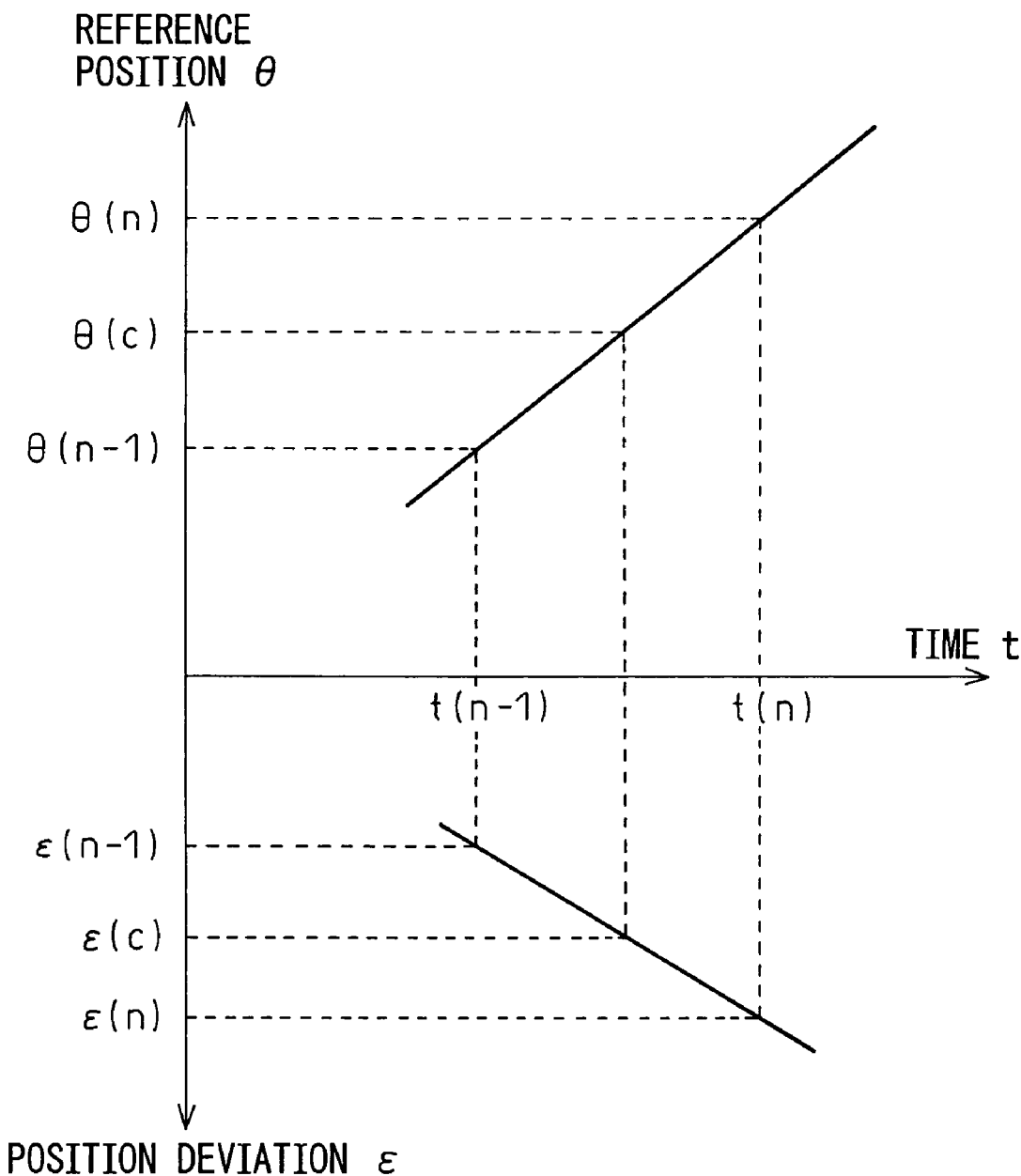
FIG. 3 is an explanatory view of processing for converting position deviation obtained at the time of sampling to position deviation at a position by a time-position converting means in the same embodiment.

FIG. 3 is an explanatory view of processing for converting the position deviation $\epsilon$ obtained at the time of sampling to the position deviation at each grid position $\theta(n)$ by the time-position converting means 22 when the reference position is different from the grid position. The abscissa indicates the time (sampling time), while the up direction of the ordinate indicates the reference position $\Theta$. Further, the down direction of the ordinate represents the position deviation $\epsilon$. Here, assume that the position deviation found in the previous sampling cycle $t(n-1)$ is $\epsilon(n-1)$, and the reference position $\Theta$ is $\Theta(n-1)$. Assume that the position deviation found at the sampling time $t(n)$ is $\epsilon(n)$, and the reference position $\Theta$ is $\Theta(n)$. The grid position between the reference positions $\Theta(n-1)$ and $\Theta(n)$ in the previous sampling cycle and this sampling cycle is found. For example, as shown in FIG. 3, it is assumed that the grid position $\theta(c)$ exists between these positions $\Theta(n-1)$ and $\Theta(n)$.

Further, at the sampling times $t(n-1)$ and $t(n)$, when the detected position deviations are $\epsilon(n-1)$ and $\epsilon(n)$, the position deviations are linearly approximated between the reference positions $\Theta n-1)$ and $\Theta(n)$. The position deviation $\epsilon(c)$ at the grid position $\theta(c)$ between the reference positions $\Theta(n-1)$ and $\Theta(n)$ can be found by internal interpolation as shown in the following formula 1.

$$\epsilon(c)=\epsilon(n-1)+\{\theta(c)-\Theta(n-1)\}\cdot\{\epsilon(n)-(n-1)\}/\{\Theta(n)-\Theta(n-1)\} \qquad (1)$$

The adder 23 adds the position deviation $\epsilon(c)$ at the grid position $\theta(c)$ found in this way and the correction data $\delta(c)$ stored corresponding to the grid position $\theta(c)$ in the memory means 25. Thereafter, the processing of the filter means 24 is carried out to find new correction data $\delta(c)$ corresponding to the grid position $\theta(c)$, then this is stored in the memory portion corresponding to the grid position $\theta(c)$ of the memory means 25 to update it. Note that when there is no grid position between the reference positions $\Theta(n-1)$ and $\Theta(n)$, the correction data of the memory means is not updated. Further, when there are a plurality of grid positions between these reference positions $\Theta(n-1)$ and $\Theta(n)$, the correction data with respect to these plurality of grid positions are updated.

Figure 4:
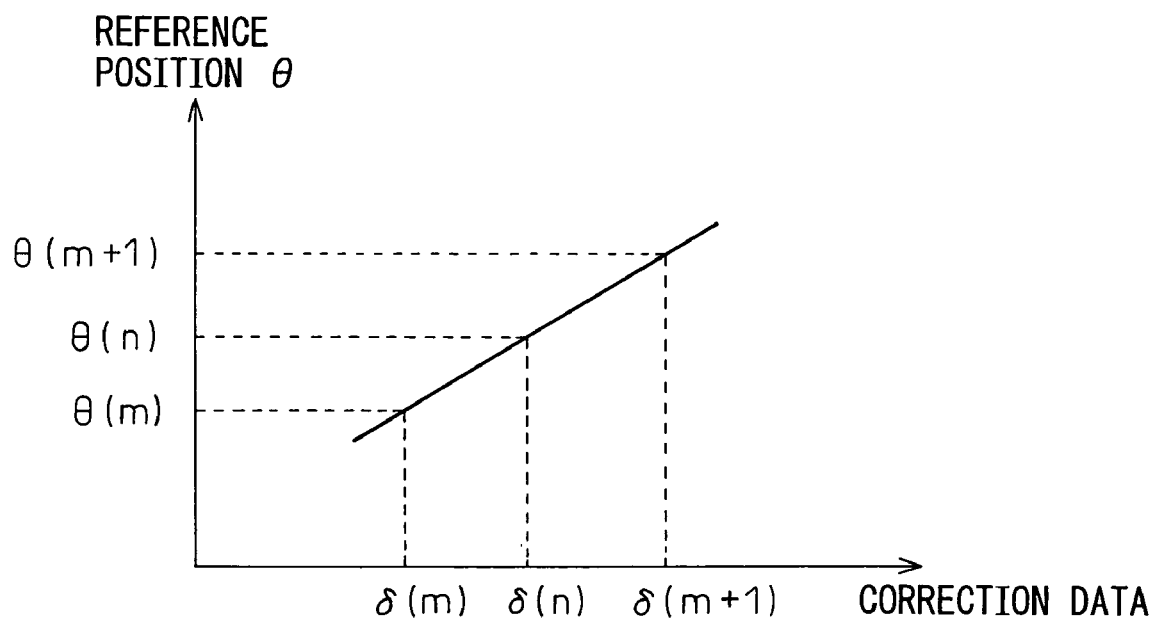
FIG. 4 is an explanatory view of processing for converting correction data with respect to a position to correction data at the time of sampling by a position-time converting means in the same embodiment.

FIG. 4 is an explanatory view of the processing for finding the correction data $\delta(n)$ at the time of sampling from the reference position $\Theta$ obtained at the time of sampling by the position-time converting means 26. When the reference position obtained at the time of sampling is $\Theta(n)$, it is assumed that the correction data stored in the memory means 25 corresponding to the grid position $\theta(m)$ and $\theta(m+1)$ before and after the position $\Theta(n)$ are $\delta(m)$ and $\delta(m+1)$. Then, the correction data is linearly approximated from the grid position $\theta(m)$ to $\theta(m+1)$. The correction data $\delta(n)$ corresponding to the reference position $\Theta(n)$ in the pattern cycle at the time of the sampling is obtained by interpolation by the following formula 2.

$$\delta(n)=\delta(m)+\{\Theta(n)-\Theta(m)\}\cdot\{\delta(m+1)-\delta(m)/\{\theta(m+1)-\theta(m)\}\} \quad (2)$$

The correction data δ(n) obtained in this way corresponds to the reference position Θ(n) at the time of the sampling and corresponds to also the command position to the slave motor 5s, therefore can be used as the correction data at the time of sampling. As explained above, the correction data δ(n) is subjected to the movement characteristic compensation processing (27) to find the correction amount which is then added to the position deviation in the sampling cycle. Note that, at the time of each sampling, the processing of the position-time converting means 26 is carried out first, then the processing of the time-position converting means 22 is executed and the correction data to be stored in the memory means 25 is updated.

Figure 5:
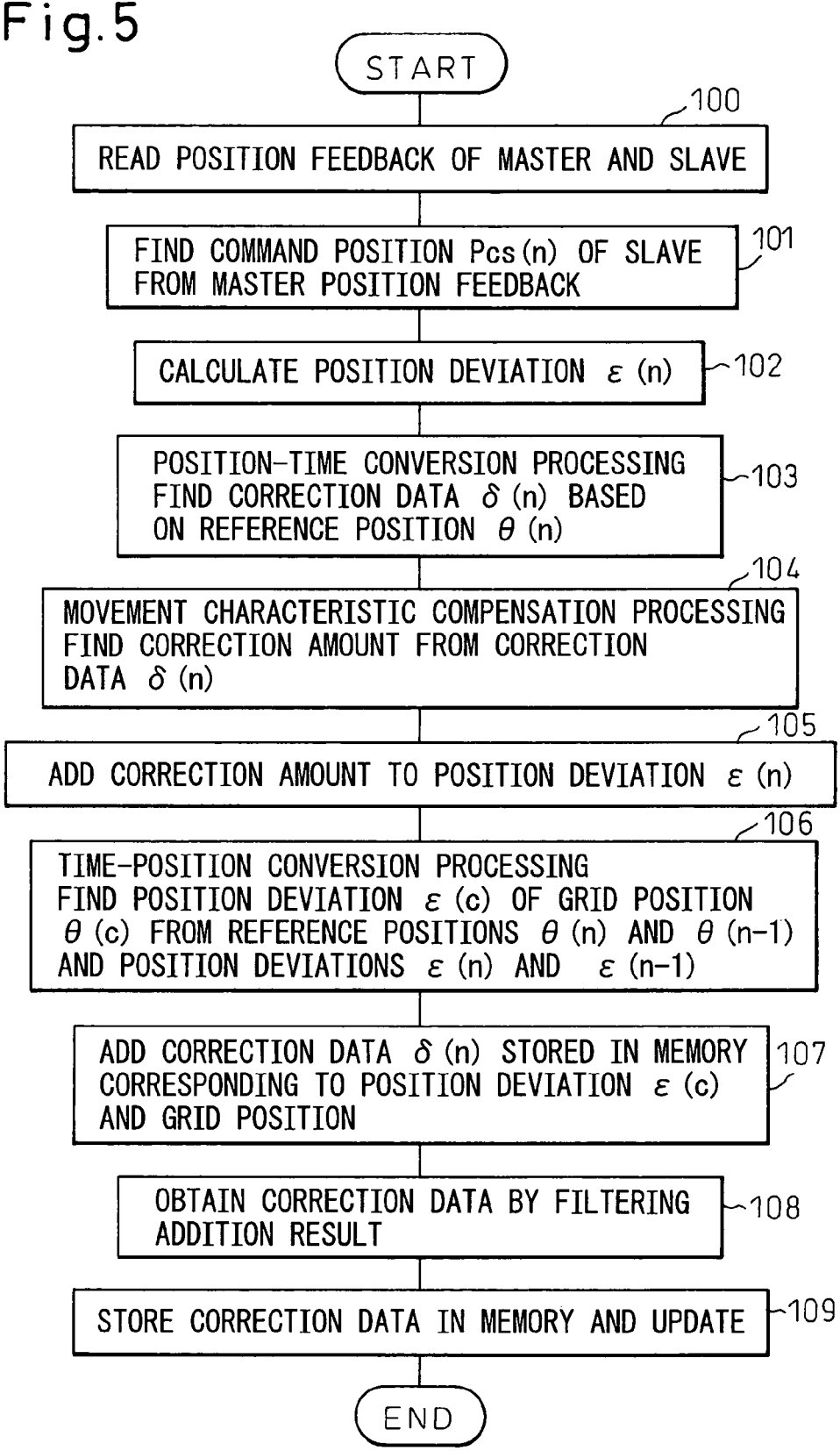
FIG. 5 is a flowchart of processing mainly comprising learning control processing in the same embodiment.

FIG. 5 is a flowchart of the processing executed for every predetermined sampling cycle (position and speed loop processing cycle) for controlling the slave motor 5s by the processing unit of the control device for the position and speed loop processing etc.

First, the master motor 5m is driven to position the master motor 5m at the position where one rotation signal is output from the position and speed detector 6m, then the slave motor 5s is driven to position the tool at the operation start position. Then, the speed command is output from the host controller to the master motor 5m and, at the same time, the reference signal is output to turn on the switch 21. This means that the processing shown in FIG. 5 is started with respect to the slave motor 5s.

With respect to the master motor 5m, the speed control unit 2m performs the speed loop processing based on this command speed and the speed feedback from the position and speed detector 6m to find a torque command. Further, the current control unit 3m performs the current loop control based on the torque command and the current feedback, drives the master motor 5m at the instructed speed via the current amplifier 4m, and rotates the workpiece 16. This processing is the same as the conventional processing.

On the other hand, the processing with respect to the slave motor 5s, as shown in FIG. 5, first reads the position feedback from the position and speed detectors 6m and 6s attached to the master motor 5m and the slave motor 5s (step 100). The amount of the position feedback during a predetermined cycle from the master motor 5m (the movement amount of the master motor 5m during this sampling cycle) is multiplied by the set predetermined coefficient K to find the position command Pcs(n) to the slave motor 5s (step 101). This position command Pcs(n) is subtracted by the position feedback from the slave motor 5s to find the position deviation ε(n) (step 102).

Next, the processing of the position-time converting means 26 is carried out. In this embodiment, it is assumed that the position feedback of the master motor 5m is selectively set as the reference position Θ(n) (the position feedback of the master motor 5m is selected as the reference position by the selecting means 10). Grid positions θ(m) and θ(m+1) before and after the position of the position feedback of the master motor 5m read at step 100, that is, the reference position Θ(n), are found, and correction data δ(m) and δ(m+1) stored in the memory means 25 corresponding to the grid positions θ(m) and θ(m+1) are found. Then, by the computation of formula 2, the reference position Θ(n), that is, the correction data δ(n) at the time of the sampling cycle, is found (step 103).

Movement characteristic compensation processing (27) is carried out with respect to this correction data δ(n) to find the correction amount (step 104). The found correction amount is added to the position deviation ε(n) found at step 103 (step 105). The position deviation to which this correction amount is added is multiplied by the position gain to find the speed command, and speed loop processing is carried out. This point is the same as the conventional art, so illustration is omitted in FIG. 5.

Next, the processing of the time-position converting means 22 is carried out. The grid position θ(c) between the reference position Θ(n) and the reference position Θ(n−1) found in one previous sampling cycle is found. By performing the computation of formula 1 by the position deviations ε(n) and ε(n−1) at the time of sampling found together with the reference positions Θ(n−1) and Θ(n), the position deviation ε(c) at the grid position θ(c) is found (step 106).

This found position deviation ε(c) and the correction data δ(c) corresponding to the grid position θ(c) stored in the memory means 25 are added (step 107), then are filtered and updated to find the correction data δ(c) (step 108). Then, the correction data at the grid position θ(c) is overwritten by the updated correction data δ(c) to update it (step 109), then the processing of the sampling cycle is terminated.

Below, the processing shown in FIG. 5 explained above is executed for every sampling cycle (position and speed loop processing cycle) to find correction amounts corresponding to the positions in one pattern cycle, that is, the threading positions with respect to the rotation position (angle) of the workpiece 16. The position deviation of the slave motor 5s (position deviation with respect to the command position of the tool 8) at that time is corrected and defined as the new corrected position deviation and multiplied by the position gain to find a speed command. In this way, the learning control is carried out based on positions. For this reason, even if speed fluctuation occurs, the relationship of the correction data with respect to the position will not fluctuate, and the position deviation can be accurately converged to zero.

In the first embodiment, the reference position Θ was made the actual position of the master motor 5m as the position feedback of the master motor 5m, but the reference position may also be made the position feedback of the slave motor 5s.

Figure 6:
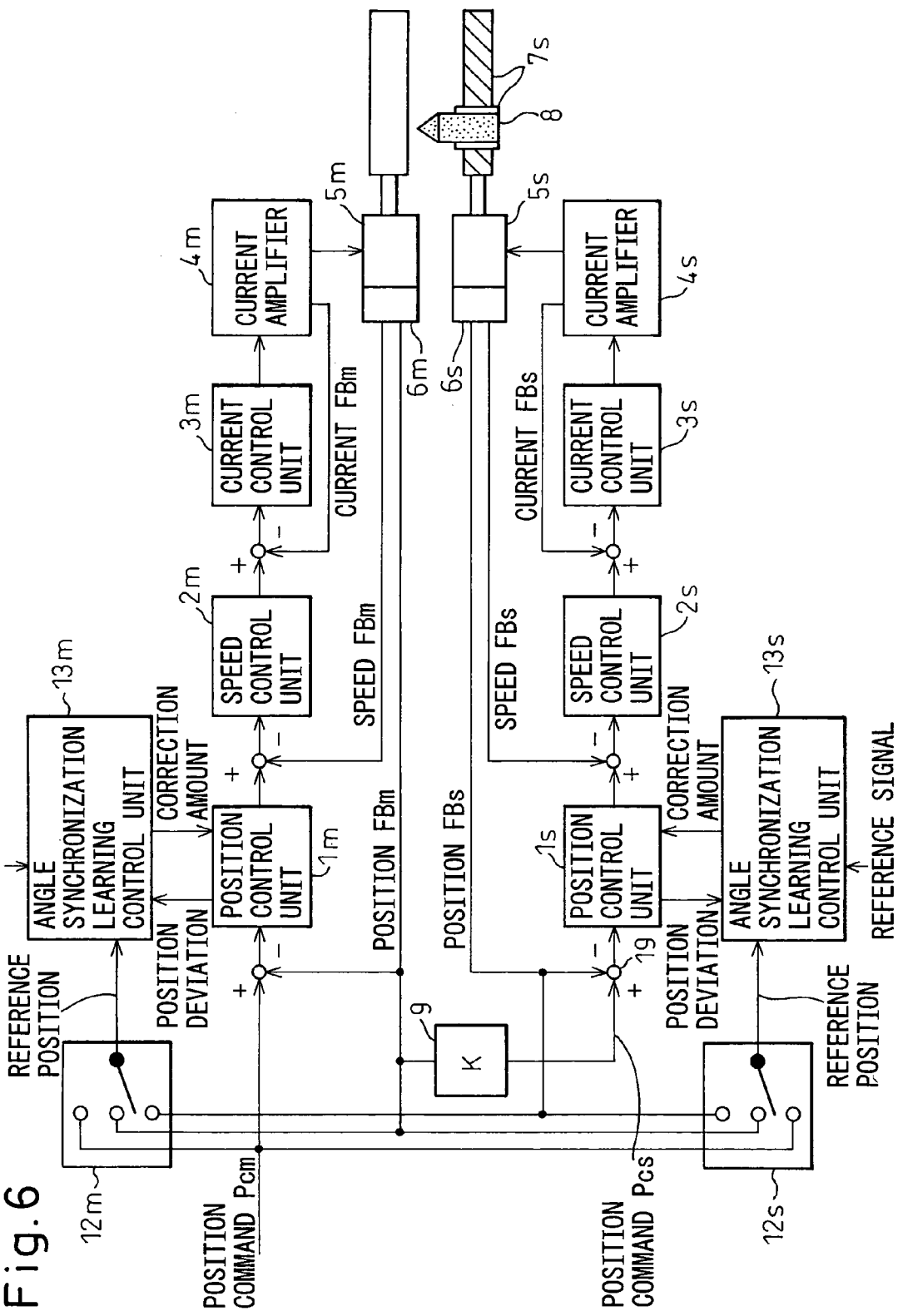
FIG. 6 is a block diagram of principal parts of a second embodiment of the present invention.

FIG. 6 is a block diagram of the motor control device of a second embodiment of the present invention. This second embodiment, in comparison with the first embodiment, also performs the position loop control for the master motor 5m, provides angle synchronization learning control units 13m and 13s for the master motor 5m and the slave motor 5s, and performs the learning control according to the angle (position) for both of the master motor 5m and the slave motor 5s. Further, as the reference position, use can be made of any of the position command Pcm to the master motor 5m, the position feedback of the master motor 5m, and the position feedback of the slave motor 5s. The reference position is selected by selectors 12m and 12s. The rest of the configuration is the same as that of the first embodiment.

The processing of the angle synchronization learning control unit 13s of the slave motor 5s is the same as the processing shown in FIG. 5 except for the point that the reference position Θ differs according to the selection. Further, the angle synchronization learning control unit 13m in the master motor 5m is substantially the same as the processing shown in FIG. 5, but differs in the points that the processing of steps 100 and 101 changes to processing for finding the position command Pcm(n) from the host controller and finding the position feedback from the master motor 5m and that the position deviation ε of the master motor 5*m* is found from this position command Pcm(n) and the position feedback at step 102. The processing of step 103 and the following steps is for performing the same processing as the processing shown in FIG. 5 and controlling the drive of the master motor 5*m*.

Figure 7:
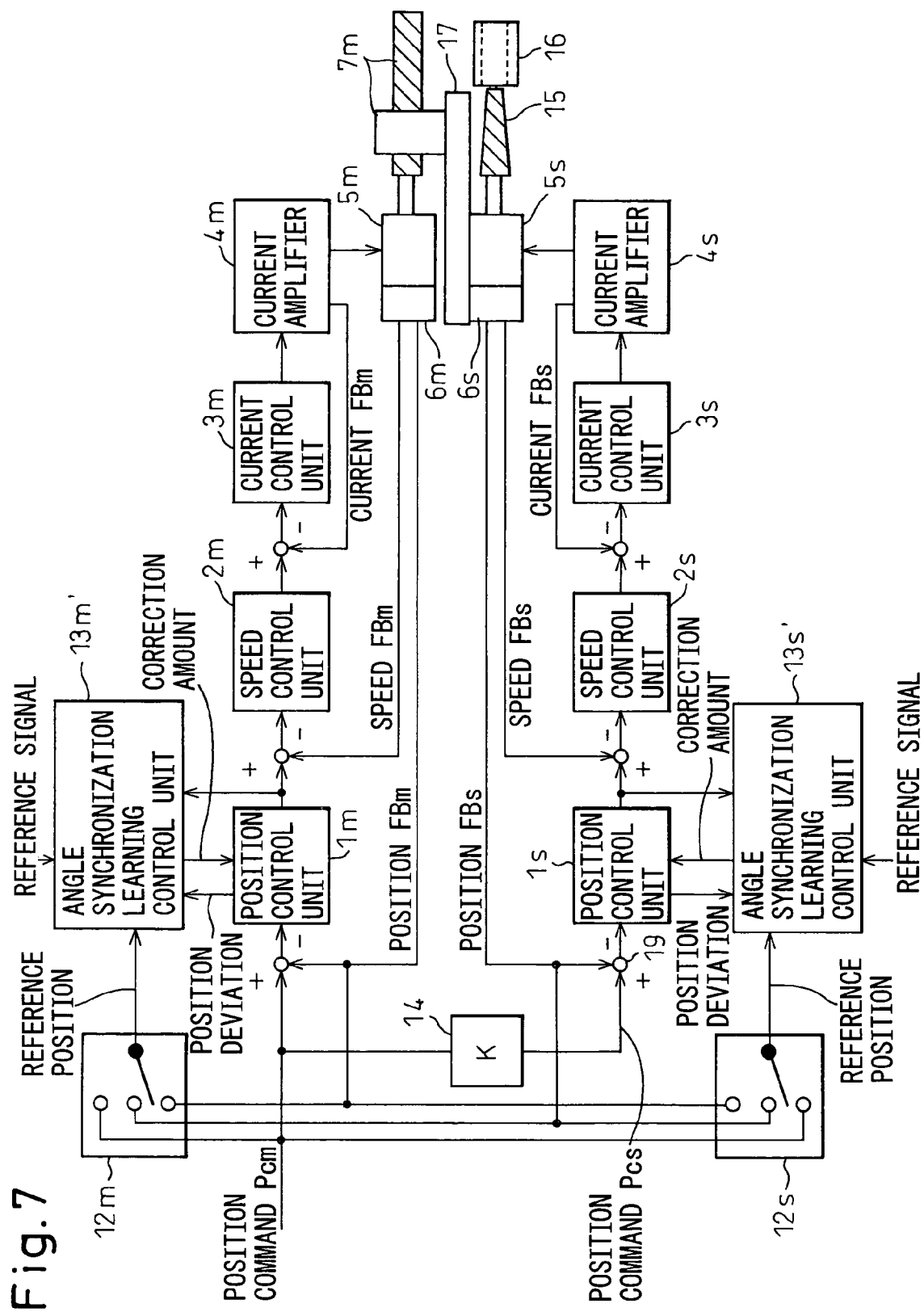
FIG. 7 is a block diagram of principal parts of a third embodiment of the present invention.

FIG. 7 is a block diagram of the motor control device of a third embodiment of the present invention. This third embodiment is an example of a control device for tapping by a tapper 15. In FIG. 7, the master motor 5*m* drives the tapper 15 in the axial direction (Z-axis direction), and the slave motor 5*s* rotates the tapper 15 to tap the workpiece 16. The tapper 15 is driven to rotate by the slave motor 5*s*. A ball screw/nut mechanism 7*m* driven by the master motor 5*m* is used to make a Z-axis moveable member 17 linearly move and thereby make the slave motor 5*s* fixed to the Z-axis moveable member 17 linearly move in the Z-axis direction.

The control system of the master motor 5*m* and the slave motor 5*s* basically resembles that of the second embodiment, but differs in the point that the position command Pcs to the slave motor 5*s* is found from the position command Pcm to the master motor 5*m* by a command processing means 14. Further, it is differs in the point that angle synchronization learning control units 13*m*' and 13*s*' provided in the master motor 5*m* and the slave motor 5*s* store the correction data at the time of the forward rotation (forward movement) and reverse rotation (backward movement) of the tapper 15, the correction data is selected according to the difference of the rotation direction, and the correction amount is found.

Figure 8:
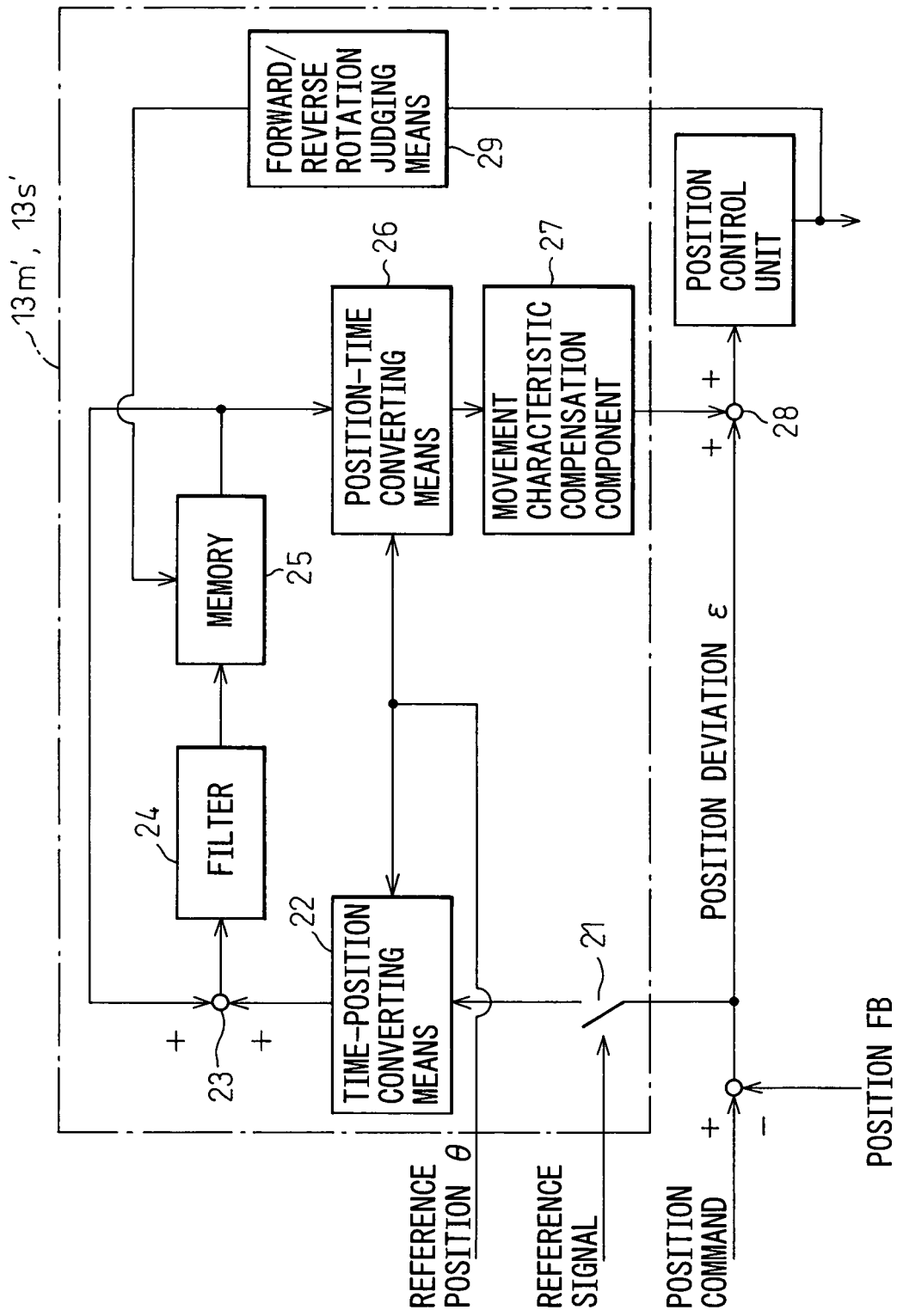
FIG. 8 is a detailed block diagram of an angle synchronization learning control unit in the third embodiment.

FIG. 8 is a detailed block diagram of the angle synchronization learning control units 13*m*' and 13*s*' in this third embodiment. The difference from the angle synchronization learning control units of the first and second embodiments of FIG. 2 resides in that the memory 25 is provided with a memory for storing the correction data corresponding to one pattern of operation where the tapper 15 forward rotates and advances to performs one tapping operation and a memory for storing the correction data in one pattern where the tapper 15 reversely rotates and retracts. Further, this differs also in the point that a forward/reverse rotation judging means 29 for judging the forward rotation and advance and reverse rotation and retraction of the tapper 15 is provided. In this embodiment, the forward/reverse rotation judging means 29 is designed to detects the signs of the speed commands (rotation directions of the motors 5*m* and 5*s*) output from the position control units 1*m* and 1*s* to automatically select the memory for the forward rotation direction or the memory for the reverse rotation direction. Note that it is also possible not to provide this forward/reverse rotation judging means 29, but to output a forward rotation or reverse rotation command from the host controller when starting the forward or reverse rotation and selecting forward rotation or reverse rotation correction data stored in the memory 25.

In this third embodiment, the tapper 15 is positioned at the position for tapping the workpiece 16, the position command Pcm to the master motor 5*m* is output to start the loop processing of the position, speed, and current including the learning control processing, and the master motor 5*m* and the slave motor 5*s* are synchronously driven. In this case, the processing with respect to the master motor 5*m* is the same as that of the flowchart of FIG. 5, the command position Pcm(n) to the master motor 5*m* is read at steps 100 and 101 and, at the same time, the position feedback of the master motor 5*m* is read and the position deviation $\epsilon$ is found at step 102. Further, the processing of step 103 and on is executed to control the master motor 5*m*.

Further, the processing with respect to the slave motor 5*s* reads the position feedback of the slave motor 5*s* at step 100 of FIG. 5. At step 101, the command position Pcm(n) to the master motor 5*m* is read. The command position Pcm(n) is multiplied by the coefficient K to obtain the position command Psm(n) to the slave motor 5*s*, and the position deviation $\epsilon$ is found from this position command Psm(n) and the position feedback at step 102. Step 103 and the following steps are the same as in the processing of FIG. 5.

Figure 9:
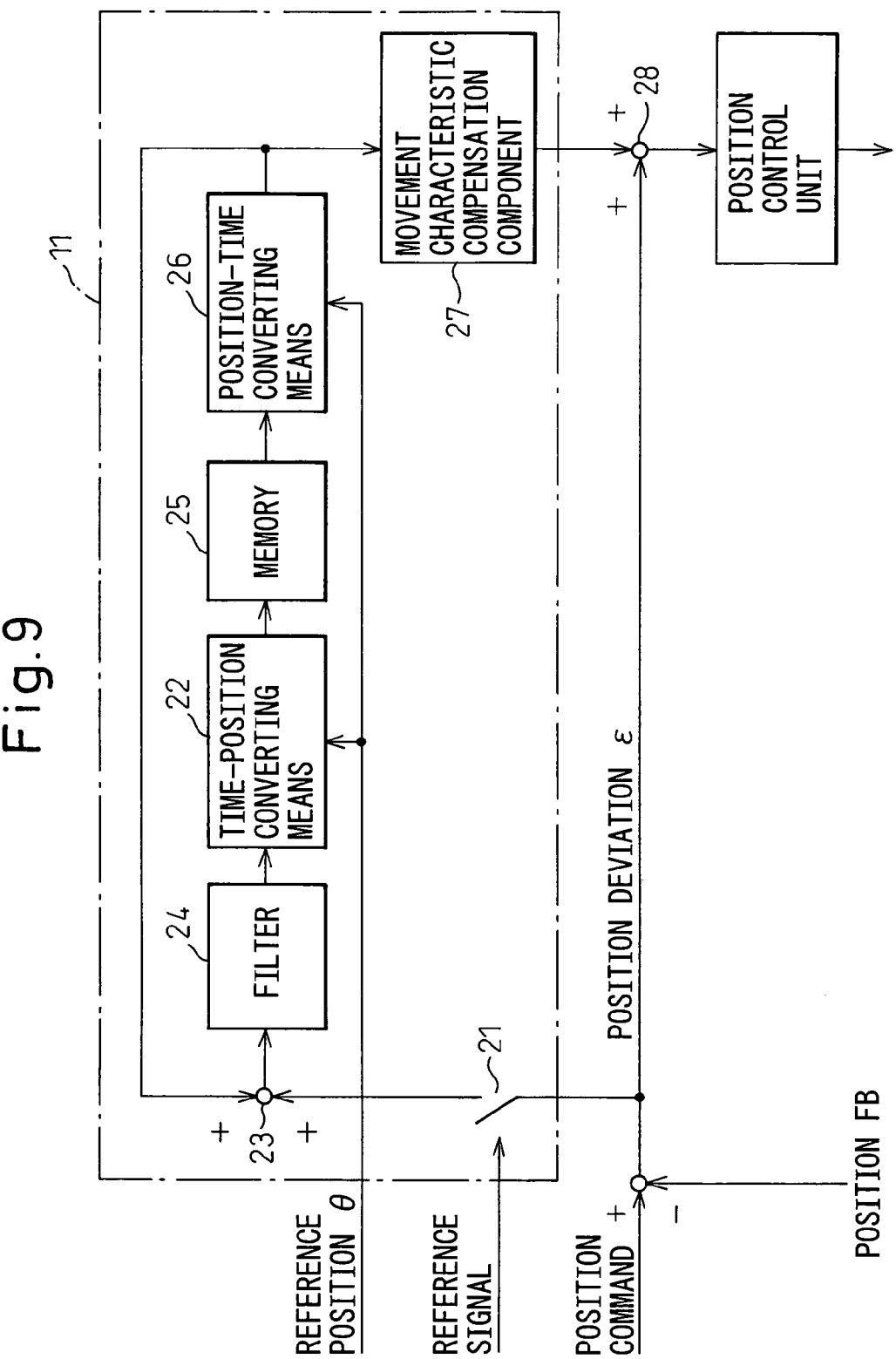
FIG. 9 is a block diagram of a modification of the angle synchronization learning control unit in the embodiments of the present invention.

FIG. 9 is a block diagram of principal parts of another embodiment of the angle synchronization learning control unit. The angle synchronization learning control unit of this embodiment differs in the point that the time-position converting means 22 is provided after the filter 24. Note that, components corresponding to components of the angle synchronization learning control unit 11 shown in FIG. 2 are assigned the same notations.

In this angle synchronization learning control unit 11', the adder 23 adds the position deviation $\epsilon(n)$ found at the time of sampling and the correction data one pattern cycle before corresponding to the sampling. Thereafter, the processing of the filter means 24 is carried out to find the correction data at the time of sampling. The time-position converting means 22 performs time-position conversion processing on this correction data to find the correction data at the grid position $\theta(c)$.

When the correction data found at the time of sampling at the previous cycle is $\delta(n-1)$, the correction data found at the time of that sampling is $\delta(n)$, and the correction data corresponding to the grid position $\theta(c)$ is $\delta(c)$, in formula 1, the next formula 3 is computed by using $\delta(c)$ in place of $\epsilon(c)$, $\delta(n-1)$ in place of $\epsilon(n-1)$, and $\delta(n)$ in place of $\epsilon(n)$.

$$\delta(c)=\delta(n-1)+\{\theta(c)-\Theta(n-1)\}\cdot\{\delta(n)-\delta(n1)\}/\{\Theta(n)\Theta(n-1)\} \quad (3)$$

The correction data $\delta(c)$ with respect to the grid position $\theta(c)$ found in this way is stored in the memory means 25 to update the correction data. The processing by the position-time converting means 26 of FIG. 9 is different from that of FIG. 2 in the point that the output of this position-time converting means 26 is given to the adder 23. However, the rest of the configuration is the same as that of the angle synchronization learning control unit 11, so further explanation will be omitted.

Further, in tapping by the tapper 15 as in the third embodiment, when storing correction data for the time when the tapper 15 forward rotates and advances and the time when it reverse rotates and retracts, it is sufficient to provide a memory portion for storing the correction data with respect to patterns at the time of the forward rotation and advance and the time of the reverse rotation and retraction in the memory means 25 of FIG. 9. Further, it is also possible to provide a forward/reverse rotation judging means for detecting the time of the forward rotation and advance and the reverse rotation and retraction as in FIG. 8.

While the invention has been described with reference to specific embodiments chosen for purpose of illustration, it should be apparent that numerous modifications could be made thereto by those skilled in the art without departing from the basic concept and scope of the invention.

What is claimed is:

1. A threading/tapping control apparatus for synchronizing a master motor and a slave motor, one of which is connected to a tool and the other of which is connected to a workpiece, and making them repeatedly perform a threading/tapping operation, comprising:

a correction data processing unit for finding correction data of position deviation of said slave motor at a predetermined position of one pattern of repeated operation of threading/tapping based on the position deviation of the slave motor at a reference position serving as a standard for synchronizing the slave motor;

a correction data memory for storing one pattern's worth of the found correction data;

a position correction processing unit for preparing a position correction amount for the position deviation at said reference position from said stored correction data; and a position control unit for using said position correction amount to correct the position deviation of said slave motor to control the position of the slave motor.

2. A threading/tapping control apparatus as set forth in claim 1, which, in order to find the position deviation of said slave motor, is further provided with:

a position feedback detection unit for detecting the position feedback of each of the master motor and the slave motor, a command processing unit for computing the position command to the slave motor from the position feedback of said master motor, and a position deviation processing unit for finding the position deviation of the slave motor from the position command to said slave motor and the position feedback of said slave motor.

3. A threading/tapping control apparatus as set forth in claim 2, wherein said reference position is one of position feedback of said master motor and position feedback of said slave motor.

4. A threading/tapping control apparatus as set forth in claim 3, further provided with a selection unit for selecting said reference position.

5. A threading/tapping control apparatus as set forth in claim 2, further provided with:

a command input portion for inputting a position command to said master motor, a position deviation processing unit for finding a position deviation of the master motor from the position command to said master motor and the position feedback of said master motor, a correction data processing unit for finding correction data of the position deviation of said master motor at the predetermined position of one pattern of a repeated operation of threading/tapping based on the position deviation of the master motor at a reference position serving as a standard for synchronizing said master motor, a correction data memory for storing one pattern's worth of the found correction data, a position correction processing unit for preparing a position correction amount at a reference position of said master motor from said stored correction data, and a position control unit for using the position correction amount to correct the position deviation of said master motor to control the position of the master motor.

6. A threading/tapping control apparatus as set forth in claim 5, wherein said reference position is one of a position command to said master motor, position feedback of said master motor, and position feedback to said slave motor.

7. A threading/tapping control apparatus as set forth in claim 6, further provided with a selection unit for selecting said reference position.

8. A threading/tapping control apparatus as set forth in claim 1, which, in order to find the position deviation of said slave motor, is further provided with:

a command input portion for inputting a position command to the master motor, a position feedback detection unit for detecting a position feedback of the slave motor, a command processing unit for computing a position command to the slave motor from the position command to the master motor, and a position deviation processing unit for finding the position deviation of the slave motor from the position command to the slave motor and the position feedback of the slave motor.

9. A threading/tapping control apparatus as set forth in claim 8, further provided with:

a position feedback detecting means for detecting position feedback to the master motor, a position deviation processing unit for finding position deviation of the master motor from the position command of said master motor and the position feedback of said master motor, a correction data processing unit for finding the correction data of the position deviation of said master motor at a predetermined position of one pattern of a repeated operation of threading/tapping based on the position deviation of the master motor at a reference position serving as a standard for synchronizing said master motor, a correction data memory for storing one pattern's worth of the found correction data, a position correction processing unit for preparing a position correction amount at said reference position from said stored correction data, and a position control unit for using said position correction amount to correct the position deviation of said master motor to control the position of the master motor.

10. A threading/tapping control apparatus as set forth in claim 9, wherein said reference position is one of a position command to said master motor, position feedback of said master motor, and position feedback to said slave motor.

11. A threading/tapping control apparatus as set forth in claim 10, further provided with a selection unit for selecting said reference position.

* * * * *